(12) United States Patent
Watanabe et al.

(10) Patent No.: US 8,742,709 B2
(45) Date of Patent: Jun. 3, 2014

(54) INTEGRATED-INVERTER ELECTRIC COMPRESSOR

(75) Inventors: Takayuki Watanabe, Tokyo (JP); Takeshi Hirano, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 297 days.

(21) Appl. No.: 13/148,161

(22) PCT Filed: Jun. 30, 2010

(86) PCT No.: PCT/JP2010/061114
§ 371 (c)(1),
(2), (4) Date: Aug. 5, 2011

(87) PCT Pub. No.: WO2011/013473
PCT Pub. Date: Feb. 3, 2011

(65) Prior Publication Data
US 2011/0291501 A1    Dec. 1, 2011

(30) Foreign Application Priority Data
Jul. 30, 2009   (JP) .................................. 2009-178007

(51) Int. Cl.
*H02P 6/14*   (2006.01)

(52) U.S. Cl.
USPC .............. 318/400.26; 318/400.24; 318/400.3; 310/71; 310/89

(58) Field of Classification Search
USPC ......... 318/400.24, 400.26, 400.3, 254.1, 801; 310/71, 89; 361/820; 417/410.1
See application file for complete search history.

(56) References Cited

U.S. PATENT DOCUMENTS

| | | | |
|---|---|---|---|
| 7,102,323 B2 * | 9/2006 | Zhou et al. ..................... | 318/801 |
| 7,954,337 B2 * | 6/2011 | Nakagami et al. .............. | 62/508 |
| 8,257,060 B2 * | 9/2012 | Hattori et al. .............. | 417/410.1 |

(Continued)

FOREIGN PATENT DOCUMENTS

| CN | 101187364 A | 5/2008 |
|---|---|---|
| CN | 201242230 Y | 5/2009 |

(Continued)

OTHER PUBLICATIONS

International Search Report for PCT/JP2010/061114, mailing date of Oct. 5, 2010.

(Continued)

*Primary Examiner* — Paul Ip
(74) *Attorney, Agent, or Firm* — Westerman, Hattori, Daniels & Adrian, LLP

(57) ABSTRACT

Provided is an integrated-inverter electric compressor with suppressed self-noise interference in an inverter unit, simplified electrical connections between an inverter circuit and a filter circuit, and fewer welded positions. A housing (2) has, on the periphery thereof, an inverter box (5) accommodating the inverter circuit (21) and a junction box (6) communicating with the inverter box (5) and accommodating a plurality of high-voltage components constituting a noise-suppression filter circuit (27). The plurality of high-voltage components accommodated in the junction box (6) are electrically connected via a busbar (33). The busbar (33) includes branched busbars (34) branched off near connections with a high-voltage component installed close to the inverter circuit (21), and the branched busbars (34) are connected to P-N terminals (25) of the inverter circuit (21) in a communicating section (12) between the junction box (6) and the inverter box (5).

10 Claims, 6 Drawing Sheets

(56) References Cited

U.S. PATENT DOCUMENTS

| | | | |
|---|---|---|---|
| 8,408,883 B2 * | 4/2013 | Ichise et al. | 417/366 |
| 8,435,019 B2 * | 5/2013 | Ichise et al. | 417/423.7 |
| 8,441,160 B2 * | 5/2013 | Watanabe et al. | 310/71 |
| 2006/0113952 A1 * | 6/2006 | Zhou et al. | 318/801 |
| 2009/0096301 A1 * | 4/2009 | Sumi et al. | 310/89 |
| 2009/0309525 A1 * | 12/2009 | Kubo et al. | 318/400.3 |
| 2010/0247349 A1 * | 9/2010 | Asai et al. | 417/410.1 |
| 2010/0284838 A1 * | 11/2010 | Ichise et al. | 417/410.1 |
| 2010/0303648 A1 * | 12/2010 | Watanabe et al. | 417/411 |
| 2011/0116950 A1 * | 5/2011 | Niwa et al. | 417/410.1 |
| 2011/0163705 A1 * | 7/2011 | Sato et al. | 318/400.24 |
| 2011/0261588 A1 * | 10/2011 | Hattori et al. | 363/13 |
| 2011/0299265 A1 * | 12/2011 | Nakatsu et al. | 361/820 |
| 2012/0200164 A1 * | 8/2012 | Nakatsu et al. | 307/82 |

FOREIGN PATENT DOCUMENTS

| | | | |
|---|---|---|---|
| JP | 2003-322082 A | 11/2003 |
| JP | 2004-225580 A | 8/2004 |
| JP | 2008-193767 A | 8/2008 |
| JP | 2009-74517 A | 4/2009 |
| JP | 2009-148011 A | 7/2009 |
| JP | 2009-156213 A | 7/2009 |

OTHER PUBLICATIONS

Japanese Decision to Grant a Patent dated Sep. 17, 2013, issued in corresponding Japanese Patent application No. 2009-178007. Explanation of Relevancy—"The Decision on Patent Grant has been received".

Chinese Office Action issued on Sep. 13, 2013 in corresponding Chinese Patent Application No. 201080009787.8. English Translation (10 pages).

Notice of Allowance dated Jan. 27, 2014, issued in corresponding Chinese application No. 201080009787.8 (2 pages). Explanation of Relevancy—"The Decision to Grant a Patent has been received".

* cited by examiner

29A~29D
30A, 30B

33C~33F
(32C, 32D)

33A, 33B 28A, 28B

INTEGRATED-INVERTER ELECTRIC COMPRESSOR

TECHNICAL FIELD

The present invention relates to an integrated-inverter electric compressor including an inverter unit integrally built into the periphery of a housing containing an electric motor and a compression mechanism.

BACKGROUND ART

An integrated-inverter electric compressor is used as a compressor for air conditioners installed in electric cars and hybrid cars. This integrated-inverter electric compressor includes an inverter-accommodating portion (inverter box) disposed on the periphery of a housing containing an electric motor and a compression mechanism, and built into the interior thereof is an inverter unit for converting DC power supplied from a power supply to AC power and applying it to the electric motor so that the rotational speed can be changed based on a control signal transmitted from a vehicle-mounted control unit (ECU).

The inverter unit includes an inverter circuit composed of a power board on which are mounted, for example, a plurality of semiconductor switching devices (e.g., IGBT) for converting DC power to AC power and applying it to the electric motor and a control board on which is mounted a control and communication circuit, such as a CPU, for controlling the AC power applied to the electric motor based on a control signal from the ECU; and high-voltage components, such as a capacitor, normal mode coil, and common mode coil, constituting a noise-suppression filter circuit provided on a power line for supplying DC power to the inverter circuit.

In this integrated-inverter electric compressor, the inverter circuit constituting the inverter unit and the high-voltage components constituting the filter circuit are usually accommodated and installed together in the interior of the inverter-accommodating portion (inverter box) disposed on the periphery of the housing and are built thereinto such that they are electrically connected via busbars (see, for example, PTL 1 and 2).

CITATION LIST

Patent Literature

{PTL 1}
Japanese Unexamined Patent Application, Publication No. 2003-322082
{PTL 2}
Japanese Unexamined Patent Application, Publication No. 2008-193767

SUMMARY OF INVENTION

Technical Problem

However, if the power board and the control board constituting the inverter circuit and the plurality of high-voltage components constituting the noise-suppression filter circuit are accommodated and installed together in the same inverter-accommodating portion, the routing of the power cable, the installation of the boards, the placement of the high-voltage components constituting the filter circuit, etc. in the inverter-accommodating portion, which is open in only one direction, have to be considered at the same time, which results in a layout with poor assemblability and also imposes constraints on the direction in which the power cable is led out. This increases dead space, thus increasing the overall size. Furthermore, even a minor change to the components constituting the filter circuit, such as increasing the component size by only one size, requires the housing itself, which is an aluminum die casting, to be changed, which results in problems such as the structure having low versatility. Electromagnetic noise radiated from the high-voltage components constituting the filter circuit propagates directly to the inverter circuit, which is therefore more susceptible to the electromagnetic noise radiated from the high-voltage components. This causes a problem in that the inverter unit may malfunction due to self-noise interference.

Therefore, to separate the filter circuit and the power cable from the inverter circuit for higher layout flexibility, compactness, and ability to cope with changes to the specifications and for suppression of noise interference in the inverter unit, one approach that has been considered is to separately install the inverter circuit and the plurality of high-voltage components constituting the noise-suppression filter circuit in different accommodating portions, although this requires the plurality of high-voltage components constituting the filter circuit and the inverter circuit to be electrically connected via a plurality of pairs of busbars, thus causing problems such as increased structural complexity due to the increased number of components and reduced productivity due to the corresponding increase in the number of welded positions.

An object of the present invention, which has been made in light of such circumstances, is to provide an integrated-inverter electric compressor with suppressed self-noise interference in an inverter unit, simplified electrical connections between an inverter circuit and a filter circuit, and fewer welded positions.

Solution to Problem

To solve the above problems, the integrated-inverter electric compressor of the present invention employs the following solutions.

An integrated-inverter electric compressor according to an aspect of the present invention includes an inverter unit integrally built into a periphery of a housing containing an electric motor and a compression mechanism and composed of a noise-suppression filter circuit and an inverter circuit. The housing has, on the periphery thereof, an inverter box accommodating the inverter circuit, which includes a power board for converting DC power to AC power and applying the AC power to the electric motor and a control board for controlling the AC power applied to the electric motor, and a junction box communicating with the inverter box and accommodating a plurality of high-voltage components constituting the noise-suppression filter circuit, which is provided on a power line for supplying DC power to the inverter circuit. The plurality of high-voltage components accommodated in the junction box are electrically connected via a busbar. The busbar includes branched busbars branched off near connections with a high-voltage component installed close to the inverter circuit, and the branched busbars are connected to P-N terminals of the inverter circuit in a communicating section between the junction box and the inverter box.

According to the above aspect, because the plurality of high-voltage components accommodated in the junction box are electrically connected via the busbar, the busbar is branched near the connections with the high-voltage component installed close to the inverter circuit accommodated in the inverter box, and the branched busbars are connected to the P-N terminals of the inverter circuit in the communicating section between the junction box and the inverter box, the inverter circuit of the inverter unit and the plurality of high-voltage components constituting the noise-suppression filter circuit, which are separately accommodated in the inverter box and the junction box, respectively, can be electrically connected via a single pair of busbars. This reduces the number of components, simplifying the structure, and also reduces the number of positions connected by welding, which improves productivity. Because the inverter circuit and the high-voltage components constituting the filter circuit are separately installed in the inverter box and the junction box, the layout flexibility, compactness, and ability to cope with changes to the specifications can be improved, and propagation of electromagnetic noise radiated from the high-voltage components to the inverter circuit can be reduced to prevent malfunction of the inverter unit due to self-noise interference, thus improving reliability.

For an integrated-inverter electric compressor according to an aspect of the present invention, in the above integrated-inverter electric compressor, connections between the branched busbars and the P-N terminals of the inverter circuit are exposed on an inverter box side in the communicating section between the junction box and the inverter box.

According to the above aspect, because the connections between the branched busbars and the P-N terminals of the inverter circuit are exposed on the inverter box side in the communicating section between the junction box and the inverter box, the connections between the branched busbars and the P-N terminals can be welded from the inverter box side after the junction box is installed on the housing. Thus, even if the inverter unit is divided and installed in the inverter box and the junction box, the high-voltage components can be connected to the inverter circuit without using a method such as screws, thus eliminating the need for increasing the number of components and therefore avoiding a decrease in assemblability.

For an integrated-inverter electric compressor according to an aspect of the present invention, in one of the above integrated-inverter electric compressors, the plurality of high-voltage components constituting the noise-suppression filter circuit include a capacitor, a normal mode coil, and a common mode coil, and the branched busbars are branched off from the busbar near connections with the capacitor, which is installed close to the inverter circuit.

According to the above aspect, because the plurality of high-voltage components constituting the noise-suppression filter circuit include the capacitor, the normal mode coil, and the common mode coil, and the branched busbars are branched off from the busbar near the connections with the capacitor, which is installed close to the inverter circuit, the capacitor, the normal mode coil, and the common mode coil can reduce current ripples and common mode noise to stabilize the inverter unit, and can also be easily electrically connected to the inverter circuit with a single pair of busbars branched near the connections with the capacitor, which is installed close to the inverter circuit. This simplifies the structure of the busbar, including the branched busbars, and also facilitates electrical connection between the plurality of high-voltage components and the inverter circuit.

For an integrated-inverter electric compressor according to an aspect of the present invention, in one of the above integrated-inverter electric compressors, the busbar is disposed on an inner side of a mating surface for installation of the junction box on the housing.

According to the above aspect, because the busbar is disposed on the inner side of the mating surface for installation of the junction box on the housing, when the junction box is installed on the housing, the junction box can be installed by fitting it to an installation surface of the housing from one direction. This simplifies the assembly procedure, thus improving the productivity.

For an integrated-inverter electric compressor according to an aspect of the present invention, in one of the above integrated-inverter electric compressors, electrical connections between the plurality of high-voltage components and the busbar are all weldable by moving welding electrodes in the same direction.

According to the above aspect, because the electrical connections between the plurality of high-voltage components and the busbar are all weldable by moving welding electrodes in the same direction, if the high-voltage components include a capacitor, a normal mode coil, and a common mode coil, the six electrical connections between the busbar and those high-voltage components can all be welded by moving electrodes of a welding machine in the same direction. This eliminates the need for changing the direction in which the welding electrodes are moved during the welding step, which improves workability and shortens welding time, thus improving the productivity.

For an integrated-inverter electric compressor according to an aspect of the present invention, in the above integrated-inverter electric compressor, contacts formed by bending ends of the busbar into a substantially triangular shape are provided at the electrical connections of the busbar with the plurality of high-voltage components such that leads of the high-voltage components are insertable therein.

According to the above aspect, because the contacts formed by bending the ends of the busbar into a substantially triangular shape are provided at the electrical connections of the busbar with the plurality of high-voltage components such that the leads of the high-voltage components are insertable therein, if the leads of the high-voltage components are inserted into the triangular contacts by slightly bending the leads in one direction, all the leads can be welded while being positioned at predetermined positions in the contacts. This stabilizes the quality of the welds between the busbar and the plurality of high-voltage components, thus improving welding reliability. Because the leads can be connected by elastically moving the leads, the busbar can be easily connected to the leads without using a complicated busbar shape, thus improving layout flexibility.

For an integrated-inverter electric compressor according to an aspect of the present invention, in one of the above integrated-inverter electric compressors, the junction box has a terminal block to which a power cable is connected, and electrical connections between terminals of the terminal block and the high-voltage components are weldable by moving welding electrodes in the same direction as the electrical connections between the plurality of high-voltage components and the busbar.

According to the above aspect, because the junction box has the terminal block to which the power cable is connected and the electrical connections between the terminals of the terminal block and the high-voltage components are weldable by moving welding electrodes in the same direction as the electrical connections between the plurality of high-voltage components and the busbar, the electrical connections between the terminals of the terminal block and the high-voltage components can also be welded by moving electrodes of a welding machine in the same direction. Accordingly, all the positions to be welded on the junction box can be welded by moving the electrodes in the same direction. This shortens the welding process, thus improving the productivity.

For an integrated-inverter electric compressor according to an aspect of the present invention, in one of the above integrated-inverter electric compressors, contacts formed by bending ends of the terminals of the terminal block into a substantially triangular shape are provided at the terminals of the terminal block such that leads of the high-voltage components are insertable therein.

According to the above aspect, because the contacts formed by bending the ends of the terminals of the terminal block into a substantially triangular shape are provided at the terminals of the terminal block such that the leads of the high-voltage components are insertable therein, if the leads of the high-voltage components are inserted into the triangular contacts by slightly bending the leads in one direction, the leads can be welded while being positioned in predetermined positions in the contacts. This stabilizes the quality of the welds between the terminals of the terminal block and the high-voltage components, thus improving the welding reliability. Because the leads can be connected by elastically moving the leads, the terminal block can be easily connected to the leads without using a complicated terminal block shape, thus improving the layout flexibility.

Advantageous Effects of Invention

According to the present invention, because the inverter circuit of the inverter unit and the plurality of high-voltage components constituting the noise-suppression filter circuit, which are separately accommodated in the inverter box and the junction box, respectively, can be electrically connected via a single pair of busbars, the number of components can be reduced, simplifying the structure, and the number of positions connected by welding can also be reduced, improving productivity. Because the inverter circuit and the high-voltage components constituting the filter circuit are separately installed in the inverter box and the junction box, the layout flexibility, compactness, and ability to cope with changes to the specifications can be improved, and propagation of electromagnetic noise radiated from the high-voltage components to the inverter circuit can be reduced to prevent malfunction of the inverter unit due to self-noise interference, thus improving reliability.

DESCRIPTION OF EMBODIMENTS

An embodiment of the present invention will be described below with reference to FIGS. 1 to 7.

Figure 1:
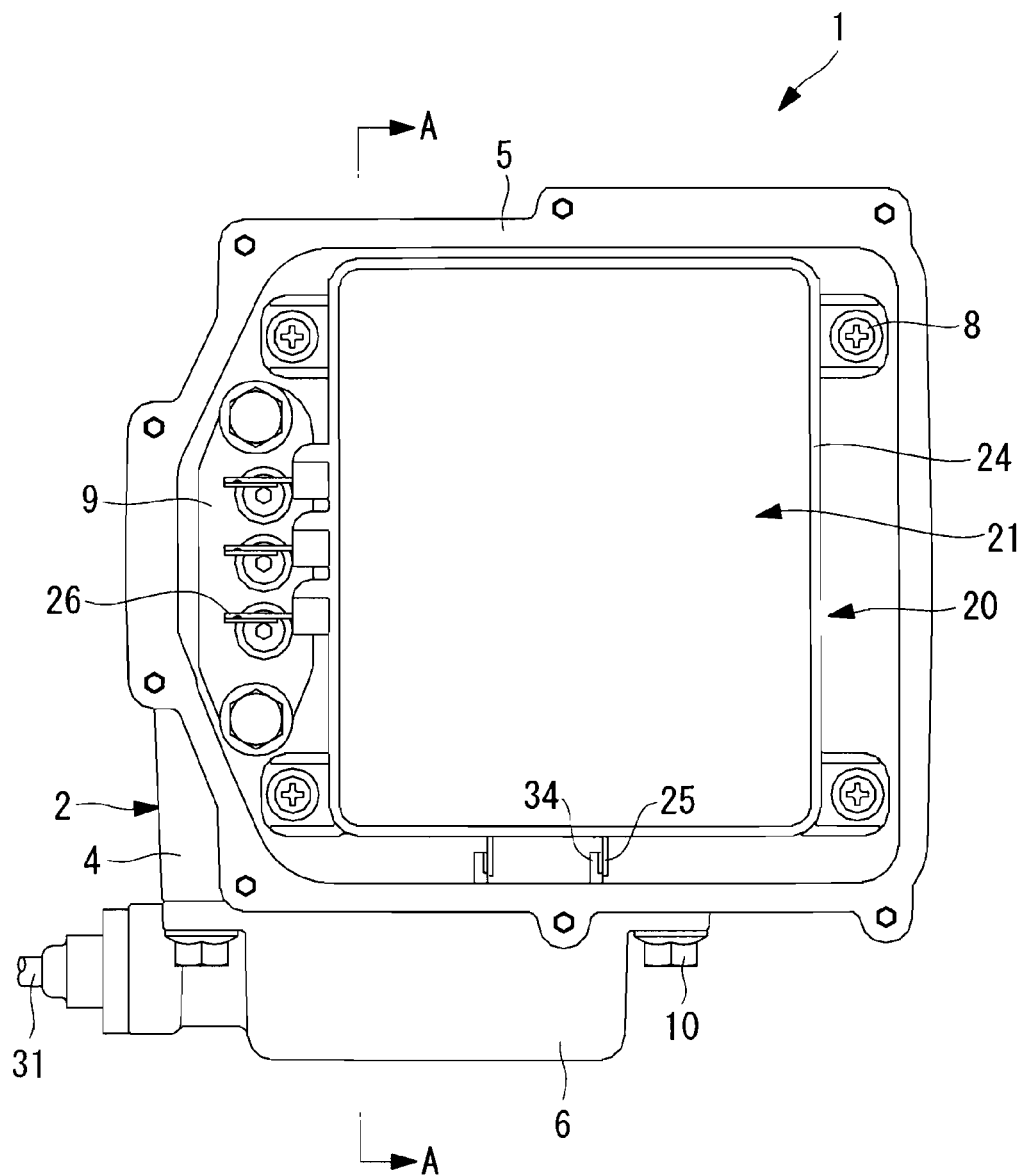
FIG. 1 is a plan view of the main part of an integrated-inverter electric compressor according to an embodiment of the present invention.
Figure 2:
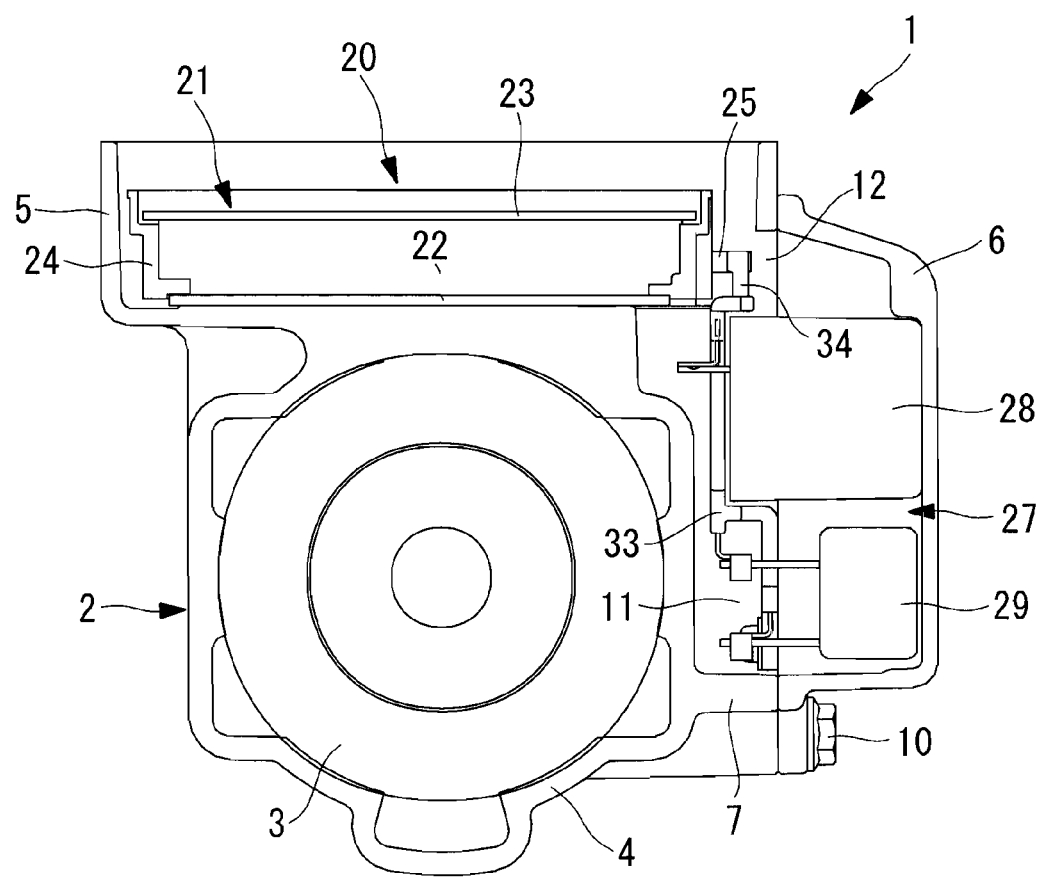
FIG. 2 is a diagram of the integrated-inverter electric compressor shown in FIG. 1 corresponding to an A-A cross section thereof.

FIG. 1 shows a plan view of the main part of an integrated-inverter electric compressor according to an embodiment of the present invention, and FIG. 2 shows a diagram corresponding to an A-A cross section thereof.

An integrated-inverter electric compressor 1 includes a tubular housing 2 constituting the outer shell thereof. The tubular housing 2 is configured by integrally fastening a motor housing 4 accommodating an electric motor 3 and a compressor housing accommodating a compression mechanism (not shown) with bolts. The motor housing 4 and the compressor housing are aluminum die castings, and only the motor housing 4 side is shown here.

The electric motor 3 and the compressor mechanism (not shown) contained in the housing 2 are coupled with a motor shaft and are configured so that the compression mechanism is driven as the electric motor 3 rotates. An intake port through which a low-pressure refrigerant gas is taken in is provided in the side of the periphery of the motor housing 4 near the rear end (to the right in FIG. 1), and the refrigerant gas taken into the motor housing 4 through the intake port flows around the electric motor 3 in the axial direction of the motor shaft and is then taken into and compressed by the compression mechanism. The high-temperature, high-pressure refrigerant gas compressed by the compression mechanism is discharged to a discharge chamber in the compressor housing and is then released outside through a discharge port (not shown) provided at the front end of the compressor housing.

An inverter box 5 having a substantially rectangular planar shape is integrally formed on the periphery of the housing (motor housing 4) 2 at the top surface thereof, and an installation surface 7 on which a junction box 6 is installed is integrally formed at a side surface thereof. This inverter box 5 has a box structure with an open top and surrounding walls of predetermined height and is configured such that the top is sealed off by a plate-shaped lid member (not shown) after an inverter circuit (inverter module) 21, configured as a module, constituting an inverter unit 20 is accommodated and installed therein.

The inverter box 5 has a substantially flat bottom surface at the position corresponding to the peripheral surface of the housing 2 and also has, in the interior thereof, a contact surface in contact with the back surface of a power board 22 constituting the inverter circuit 21, an installation surface on which the inverter circuit 21, configured as a module, is fixed and installed with screws 8, a mounting hole in which a glass-sealed terminal 9 for supplying AC power resulting from conversion through the inverter unit 20 to the electric motor 3 is installed, etc.

The inverter circuit 21 installed in the inverter box 5 is configured as a module by integrating, with a resin case 24, the power board 22, on which are mounted, for example, a plurality of semiconductor switching devices (IGBT) for converting DC power to AC power and applying it to the electric motor 3, and a control board 23 on which is mounted a control and communication circuit 23 that operates at low voltage, such as a CPU, for controlling the AC power applied to the electric motor 3, with the back surface of the power board 22 disposed in contact with the bottom surface in the inverter box 5 so as to be cooled by the low-pressure refrigerant gas flowing through the motor housing 4.

The inverter circuit (inverter module) 21, configured as a module with the resin case 24, has P-N terminals 25 to which DC power is input from a power supply and U-V-W terminals 26 through which AC power resulting from conversion through the inverter unit 20 is supplied via the glass-sealed terminal 9 to the electric motor 3 contained in the motor housing 4 such that the P-N terminals 25 and the U-V-W terminals 26 protrude outward from the periphery. The P-N terminals 25, as shown below, are disposed at positions opposite a communicating section 12 between the inverter box 5 and the junction box 6.

The installation surface 7 on which the junction box 6 is fixed and installed, as described above, is integrally formed on the periphery of the motor housing 4 (housing 2) at the side surface where the intake port is provided. This installation surface 7 has flanges of predetermined width formed on the side surface of the housing so as to protrude in a substantially rectangular shape and is configured such that the junction box 6 is fastened thereto with bolts 10, with seals such as O-rings therebetween. The top of a recess 11 surrounded by the installation surface 7 communicates with the interior of the inverter box 5 through the communicating section 12.

Figure 3:
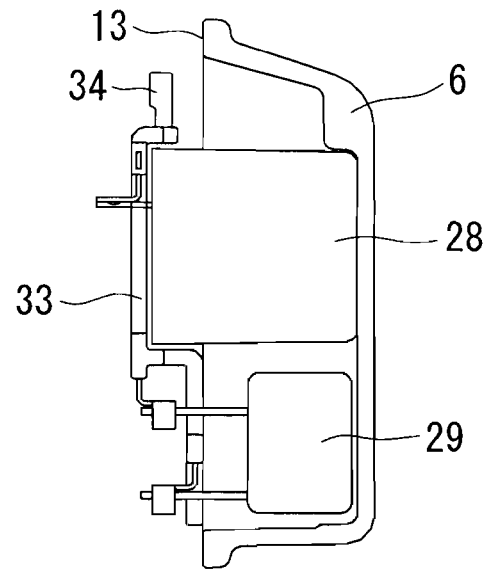
FIG. 3 is a diagram of a junction box of the integrated-inverter electric compressor shown in FIG. 1 corresponding to a longitudinal cross section thereof.
Figure 4:
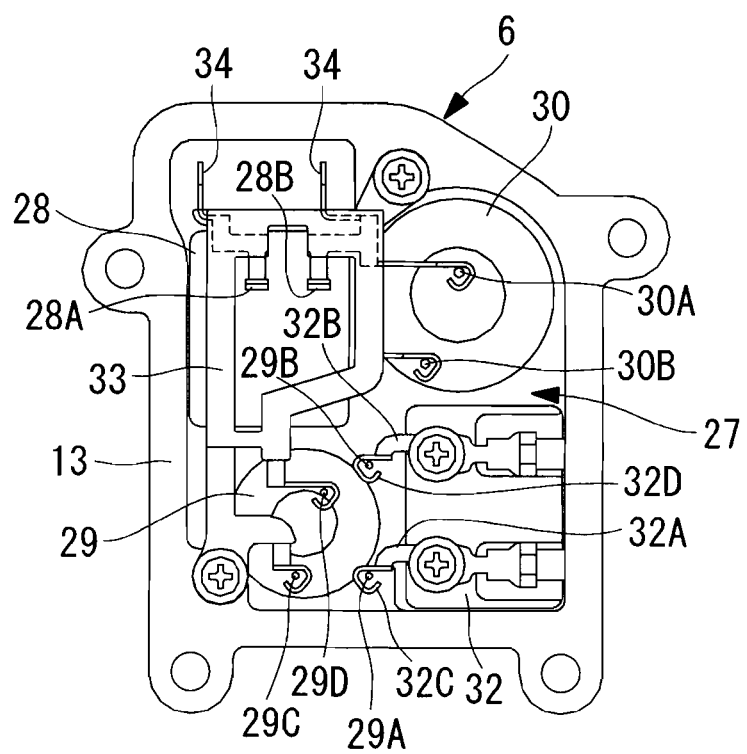
FIG. 4 is a left side view of the junction box shown in FIG. 3.
Figure 7:
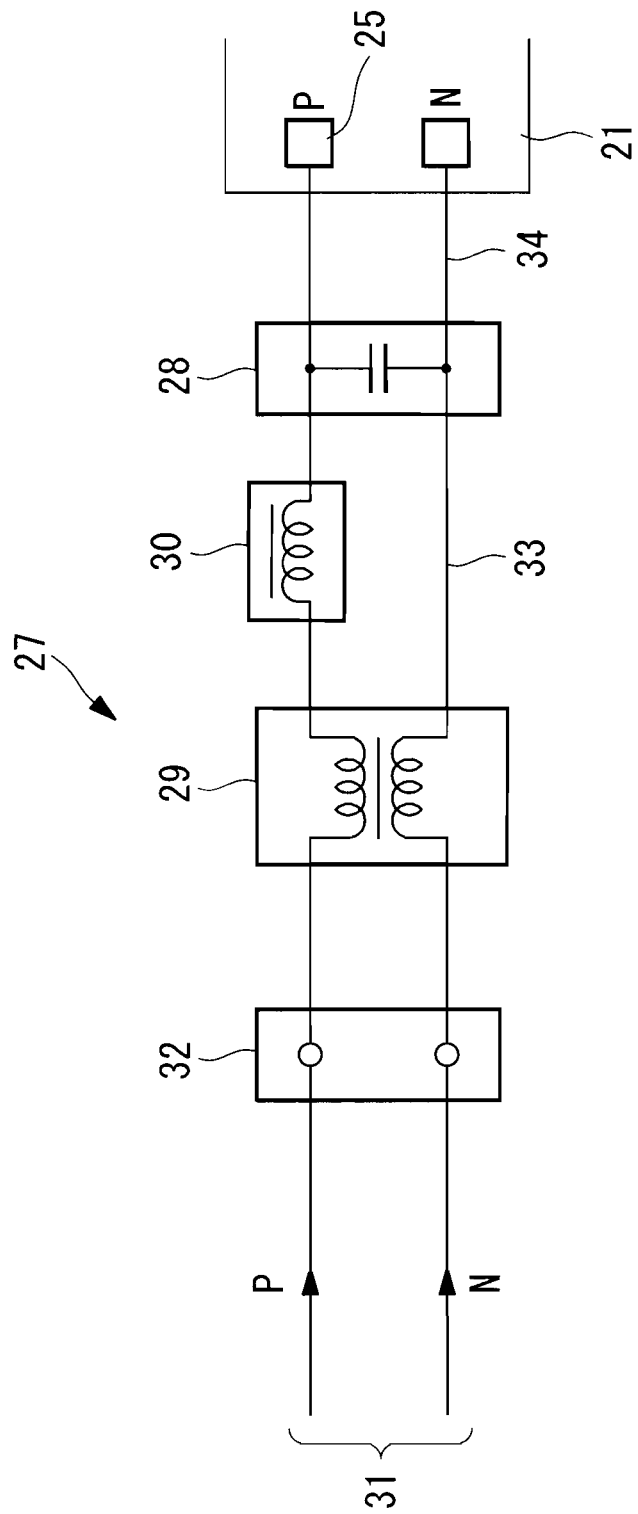
FIG. 7 is an electrical connection diagram of a plurality of high-voltage components built into the junction box shown in FIG. 4 and an inverter circuit.

As shown in FIGS. 3 and 4, the junction box 6 is a substantially rectangular aluminum die-cast box on which a mating surface 13 corresponding to the installation surface 7 is formed around the periphery thereof, a plurality of high-voltage components constituting a noise-suppression filter circuit 27 for the inverter unit 20, namely, a capacitor 28, a common mode coil 29, and a normal mode coil 30, are accommodated and installed in the interior thereof, and a terminal block 32 to which a power cable 31 is connected is built into the interior thereof. As shown in FIG. 7, the noise-suppression filter circuit 27 is configured by electrically connecting the capacitor 28, the common mode coil 29, and the normal mode coil 30 to a power line between the terminal block 32 and the inverter circuit 21 in a known manner.

The capacitor 28, the common mode coil 29, and the normal mode coil 30 are arranged such that the capacitor 28 and the normal mode coil 30 are disposed side by side in the top portion of the interior of the junction box 6, and the common mode coil 29 is disposed in the portion below the capacitor 28, each being fixed and installed with, for example, a silicone adhesive. Two terminals 28A and 28B of the capacitor 28, two leads 30A and 30B of the normal mode coil 30, and two output leads 29C and 29D of the common mode coil 29 are configured to be electrically connected via a busbar 33 screwed at two positions, that is, upper and lower positions, in the junction box 6, and two input leads 29A and 29B of the common mode coil 29 are configured to be electrically connected to two terminals 32A and 32B, respectively, provided on the terminal block 32.

Figure 5:
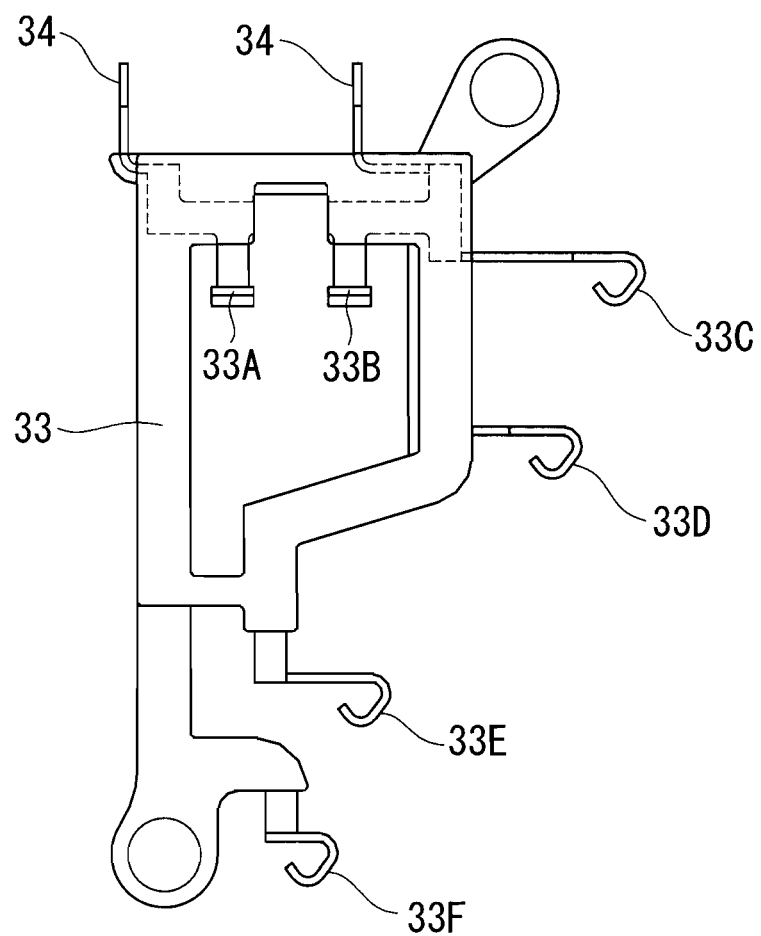
FIG. 5 is a plan view of a busbar built into the junction box shown in FIG. 4.
Figure 6A:
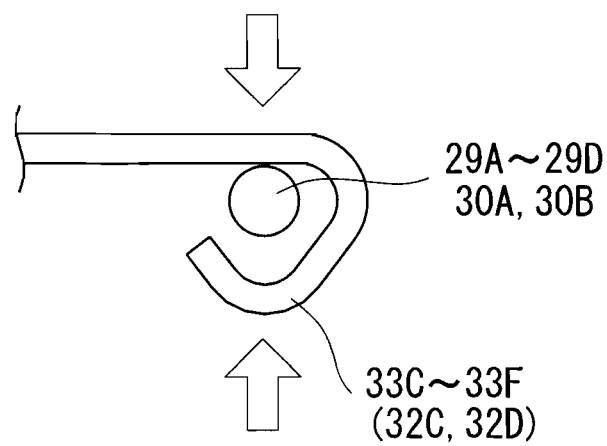
FIG. 6A is a plan view of an electrical connection between the busbar shown in FIG. 5 and a high-voltage component.
Figure 6B:
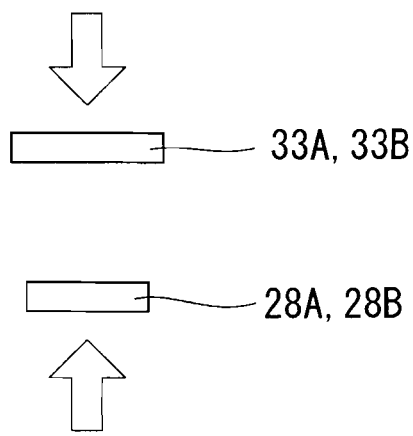
FIG. 6B is a plan view of an electrical connection between the busbar shown in FIG. 5 and a high-voltage component.

As shown in FIG. 5, the busbar 33 integrally includes a total of six electrical connections, namely, two I-shaped contacts 33A and 33B connected to the two terminals 28A and 28B, respectively, of the capacitor 28 and contacts 33C, 33D, 33E, and 33F formed by bending four ends of the busbar connected to the two leads 30A and 30B of the normal mode coil 30 and the two output lead 29C and 29D of the common mode coil 29 into a substantially triangular shape, and these electrical connections, as shown in FIGS. 6A and 6B, are all configured to be weldable by moving electrodes of a micro spot welding machine in the same direction, as indicated by the arrows.

As with the contacts 33A to 33F of the busbar 33, contacts 32C and 32D (see FIG. 6A) are formed at the ends of the two terminals 32A and 32B, respectively, of the terminal block 32, to which the two input leads 29A and 29B of the common mode coil 29 are connected, by bending the ends into a substantially triangular shape, and are all configured to be weldable by moving electrodes of a micro spot welding machine in the same direction as the contacts 33A to 33F of the busbar 33.

The busbar 33 has a pair of branched busbars 34 branched off near the contacts 33A and 33B connected to the capacitor 28, which is installed close to the inverter circuit 21. As shown in FIGS. 1 and 2, these branched busbars 34 are configured to extend to positions opposite the communicating section 12 through which the inverter box 5 communicates with the junction box 6 such that they contact the P-N terminals 25 of the inverter circuit 21 at those positions. The connections between the branched busbars 34 and the P-N terminals 25 are provided so as to be exposed on the inverter box 5 side (see FIG. 1).

The components such as the plurality of high-voltage components constituting the noise-suppression filter circuit 27, including the capacitor 28, the common mode coil 29, and the normal mode coil 30, which are accommodated and installed in the junction box 6, the busbar 33, and the terminal block 32 are all disposed on the inner side of the mating surface 13 formed at the peripheral edge of the junction box 6 and are configured such that they can be installed as a subassembly on the installation surface 7 of the housing 2 (motor housing 4) from one direction.

With the structure described above, this embodiment provides the following advantageous effects.

DC power supplied via the power cable 31 from an on-board power supply in a vehicle is input to the terminal block 32 installed in the junction box 6. This DC power is supplied through the common mode coil 29 connected to the terminals 32A and 32B of the terminal block 32 and the normal mode coil 30 and capacitor 28 connected via the busbar 33 downstream thereof to the inverter circuit 21 via the branched busbars 34 and the P-N terminals 25. Through this process, the common mode coil 29, the normal mode coil 30, and the capacitor 28 reduce, for example, common mode noise and current ripples.

The DC power input to the inverter circuit 21 is converted to AC power having the command frequency by the power board 22, which operates based on a control signal transmitted from a vehicle-mounted control unit (ECU) to the control board 23. This AC power is supplied from the U-V-W terminals 26 of the inverter circuit 21 to the electric motor 3 in the housing 2 via the glass-sealed terminal 9. Accordingly, the electric motor 3 is rotated by the AC power having the command frequency, thus driving the compression mechanism. As the compression mechanism is driven, the refrigerant taken into the motor housing 4 flows around the electric motor 3 in the axial direction of the motor shaft and is taken into the compression mechanism, where the refrigerant is compressed to a high-temperature, high-pressure state before being discharged to the discharge chamber in the housing 2. This high-pressure refrigerant is released outside through the discharge port.

During this process, the heat-generating components constituting the inverter circuit 21 of the inverter unit 20 and the noise-suppression filter circuit 27, which are separately accommodated and installed in the inverter box 5 and the junction box 6, respectively, provided on the periphery of the motor housing 4, are properly cooled by the low-pressure refrigerant gas flowing through the motor housing 4 via the wall surface of the motor housing 4. This allows the heat-generating components constituting the inverter unit 20 to be efficiently cooled, thus improving the reliability of the inverter unit 20.

Because the inverter unit 20 is divided into the inverter circuit 21 and the plurality of high-voltage components constituting the noise-suppression filter circuit 27, such as the capacitor 28, the common mode coil 29, and the normal mode coil 30, and they are separately accommodated and installed in the inverter box 5 and the junction box 6 provided on the periphery of the motor housing 4, the layout flexibility, compactness, and ability to cope with changes to the specifications can be improved, and the junction box 6 can also block electromagnetic noise radiated from the high-voltage components to prevent the noise from propagating to the inverter circuit 21 accommodated and installed in the inverter box 5. This prevents malfunction of the inverter unit 20 due to self-noise interference, thus improving the reliability.

Because the capacitor 28, the common mode coil 29, and the normal mode coil 30 accommodated in the junction box 6 are electrically connected via the busbar 33, the busbar 33 is branched near the connections with the capacitor 28, which is installed close to the inverter circuit 21 accommodated in the inverter box 5, and the branched busbars 34 are connected to the P-N terminals 25 of the inverter circuit 21 in the communicating section 12 between the junction box 6 and the inverter box 5, the inverter circuit 21 of the inverter unit 20 and the plurality of high-voltage components constituting the noise-suppression filter circuit 27, which are separately accommodated in the inverter box 5 and the junction box 6, respectively, can be electrically connected via the single pair of busbars 33. This reduces the number of components, simplifying the structure, and also reduces the number of positions connected by welding, which improves productivity.

Because the above connections between the branched busbars 34 and the P-N terminals 25 of the inverter circuit 21 are exposed on the inverter box 5 side in the communicating section 12 between the junction box 6 and the inverter box 5, the connections between the branched busbars 34 and the P-N terminals 25 can be welded from the inverter box 5 side after the junction box 6 is installed on the housing 2. Thus, even if the inverter unit 20 is divided and installed in the inverter box 5 and the junction box 6, as described above, the manner in which the high-voltage components such as the capacitor 28, the common mode coil 29, and the normal mode coil 30 are connected to the inverter circuit 21 does not have to be changed, thus avoiding a decrease in assemblability.

Because the plurality of high-voltage components constituting the noise-suppression filter circuit 21 include the capacitor 28, the common mode coil 29, and the normal mode coil 30 and the branched busbars 34 are branched off from the busbar 33 near the connections with the capacitor 28, which is installed close to the inverter circuit 21, the capacitor 28, the common mode coil 29, and the normal mode coil 30 can reduce current ripples and common mode noise to stabilize the inverter unit 20, and can also be easily connected to the inverter circuit 21 with the single pair of busbars 33 branched near the connections with the capacitor 28, which is installed close to the inverter circuit 21. This simplifies the structure of the busbar 33, including the branched busbars 34, and also facilitates electrical connection between the plurality of high-voltage components and the inverter circuit 21.

Because the busbar 33 is disposed on the inner side of the mating surface 13 for installation of the junction box 6 on the housing 2, when the junction box 6 is installed on the housing 2 as a subassembly, the junction box 6 can be installed by fitting it to the installation surface 7 of the housing 2 from one direction. This simplifies the procedure for assembling the junction box 6, thus improving the productivity.

Because the electrical connections between the capacitor 28, the common mode coil 29, and the normal mode coil 30 constituting the noise-suppression circuit 27 and the busbar 33 and the terminal block 32 are all configured to be weldable by moving electrodes of a welding machine in the same direction, the eight electrical connections between the capacitor 28, the common mode coil 29, and the normal mode coil 30 constituting the noise-suppression circuit 27 and the busbar 33 and the terminal block 32 can all be welded by moving electrodes of a welding machine in the same direction. This eliminates the need for changing the direction in which electrodes of a welding machine are moved during the welding step to improve the workability and shorten the welding time, thus improving the productivity.

The contacts 33C to 33F and the contacts 32C and 32D formed by bending the ends of the busbar and the ends of the terminals of the terminal block into a substantially triangular shape are provided at the electrical connections of the busbar 33 and the terminal block 32 with the common mode coil 29 and the normal mode coil 30 such that the leads 29A to 29D of the common mode coil 29 and the leads 30A and 30B of the normal mode coil 30 are insertable therein. Thus, if the leads 29A to 29D of the common mode coil 29 and the leads 30A and 30B of the normal mode coil 30 are inserted into the triangular contacts 33C to 33F, 32C, and 32D by slightly bending the leads 29A to 29D, 30A, and 30B in one direction, all the leads 29A to 29D, 30A, and 30B can be welded while being positioned in predetermined positions in the contacts 33C to 33F, 32C, and 32D. This stabilizes the quality of the welds between the busbar 33 and the terminal block 32 and the common mode coil 29 and the normal mode coil 30, thus improving welding reliability.

Because all the leads 29A to 29D, 30A, and 30B can be connected to the contacts 33C to 33F of the busbar 33 and the contacts 32C and 32D of the terminal block 32 by elastically moving the leads 29A to 29D, 30A, and 30B, the busbar 33 and the terminal block 32 can be easily connected to the leads 29A to 29D of the common mode coil 29 and the leads 30A and 30B of the normal mode coil 30 without using a complicated busbar shape or terminal block shape, thus improving the layout flexibility.

The present invention is not limited to the invention according to the above embodiment; various modifications are permitted without departing from the spirit thereof. In the above embodiment, for example, the compression mechanism of the integrated-inverter electric compressor 1 may be any type of compression mechanism. Although an example in which the inverter box 5 is integrally formed on the housing (motor housing 4) 2 has been described, the inverter box 5 may be configured such that it is separated from the housing 2 and is installed on the housing 2. Although an example in which the busbar 33 and the terminal block 32 are connected to the plurality of high-voltage components by micro resistance welding has been described, the welding method is not limited thereto; it should be understood that the optimum welding method is selected depending on the materials of the members welded.

REFERENCE SIGNS LIST 1 integrated-inverter electric compressor
2 housing
3 electric motor
4 motor housing
5 inverter box
6 junction box
12 communicating section
13 mating surface
20 inverter unit
21 inverter circuit
22 power board 23 control board
25 P-N terminal
27 noise-suppression filter circuit
28 capacitor
28A, 28B terminal of capacitor
29 common mode coil
29A, 29B, 29C, 29D lead of common mode coil
30 normal mode coil
30A, 30B lead of normal mode coil
32 terminal block
32A, 32B terminal of terminal block
32C, 32D contact
33 busbar
33A, 33B, 33C, 33D, 33E, 33F contact
34 branched busbar

The invention claimed is:

1. An integrated-inverter electric compressor, comprising:
an inverter unit integrally built into a periphery of a housing containing an electric motor and a compression mechanism, the inverter unit comprising a noise-suppression filter circuit and an inverter circuit;
wherein the housing has, on the periphery thereof, an inverter box accommodating the inverter circuit, which includes a power board for converting DC power to AC power and applying the AC power to the electric motor and a control board for controlling the AC power applied to the electric motor, and
a junction box which is individually provided with the inverter box, communicates with the inverter box, accommodates the noise-suppression filter circuit, which is provided on a power line for supplying DC power to the inverter circuit;
wherein the noise-suppression filter circuit is configured by the plurality of high-voltage components which are electrically connected via a pair of busbars; and
wherein the pair of busbars includes branched busbars branched off near connections with a high-voltage component installed close to the inverter circuit, the branched busbars being connected to P-N terminals of the inverter circuit in a communicating section between the junction box and the inverter box.

2. The integrated-inverter electric compressor according to claim 1, wherein connections between the branched busbars and the P-N terminals of the inverter circuit are exposed on an inverter box side in the communicating section between the junction box and the inverter box.

3. The integrated-inverter electric compressor according to claim 1, wherein the plurality of high-voltage components constituting the noise-suppression filter circuit include a capacitor, a normal mode coil, and a common mode coil, the branched busbars being branched off from the pair of busbars near connections with the capacitor, which is installed close to the inverter circuit.

4. The integrated-inverter electric compressor according to claim 1, wherein the pair of busbars is disposed on an inner side of a mating surface for installation of the junction box on the housing.

5. The integrated-inverter electric compressor according to claim 1, wherein electrical connections between the plurality of high-voltage components and the pair of busbars are all weldable by moving welding electrodes in the same direction.

6. The integrated-inverter electric compressor according to claim 5, wherein contacts formed by bending ends of the pair of busbars into a substantially triangular shape are provided at the electrical connections of the pair of busbars with the plurality of high-voltage components such that leads of the high-voltage components are insertable therein.

7. The integrated-inverter electric compressor according to claim 5, wherein the junction box has a terminal block to which a power cable is connected, electrical connections between terminals of the terminal block and the high-voltage components being weldable by moving welding electrodes in the same direction as the electrical connections between the plurality of high-voltage components and the pair of busbars.

8. The integrated-inverter electric compressor according to claim 7, wherein contacts formed by bending ends of the terminals of the terminal block into a substantially triangular shape are provided at the terminals of the terminal block such that leads of the high-voltage components are insertable therein.

9. The integrated-inverter electric compressor according to claim 2, wherein the plurality of high-voltage components constituting the noise-suppression filter circuit include a capacitor, a normal mode coil, and a common mode coil, the branched busbars being branched off from the pair of busbars near connections with the capacitor, which is installed close to the inverter circuit.

10. The integrated-inverter electric compressor according to claim 6, wherein the junction box has a terminal block to which a power cable is connected, electrical connections between terminals of the terminal block and the high-voltage components being weldable by moving welding electrodes in the same direction as the electrical connections between the plurality of high-voltage components and the pair of busbars.

* * * * *